Sept. 16, 1941. E. ORSHANSKY, JR 2,256,324
TRANSMISSION
Filed July 20, 1939 11 Sheets-Sheet 9
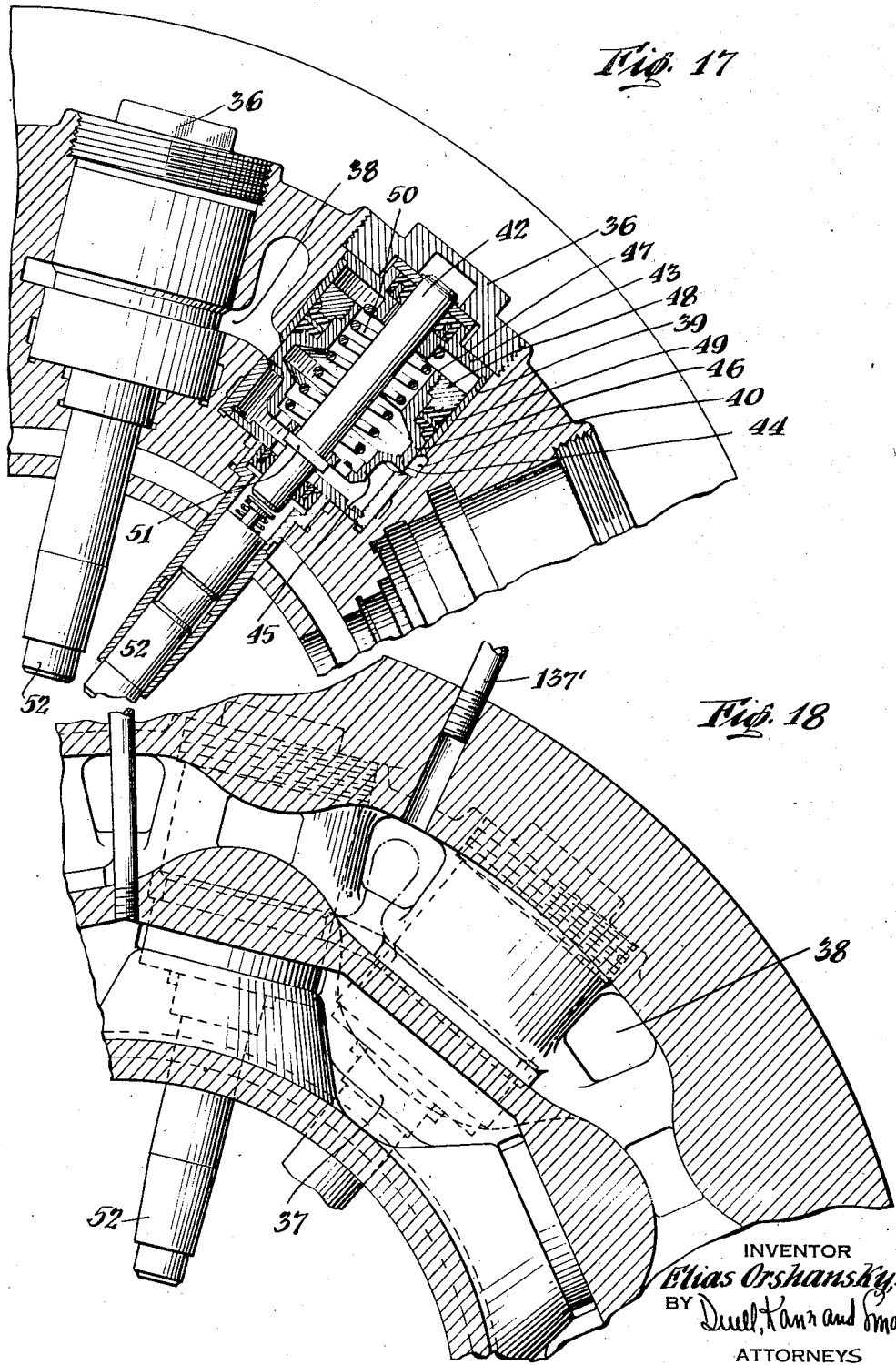

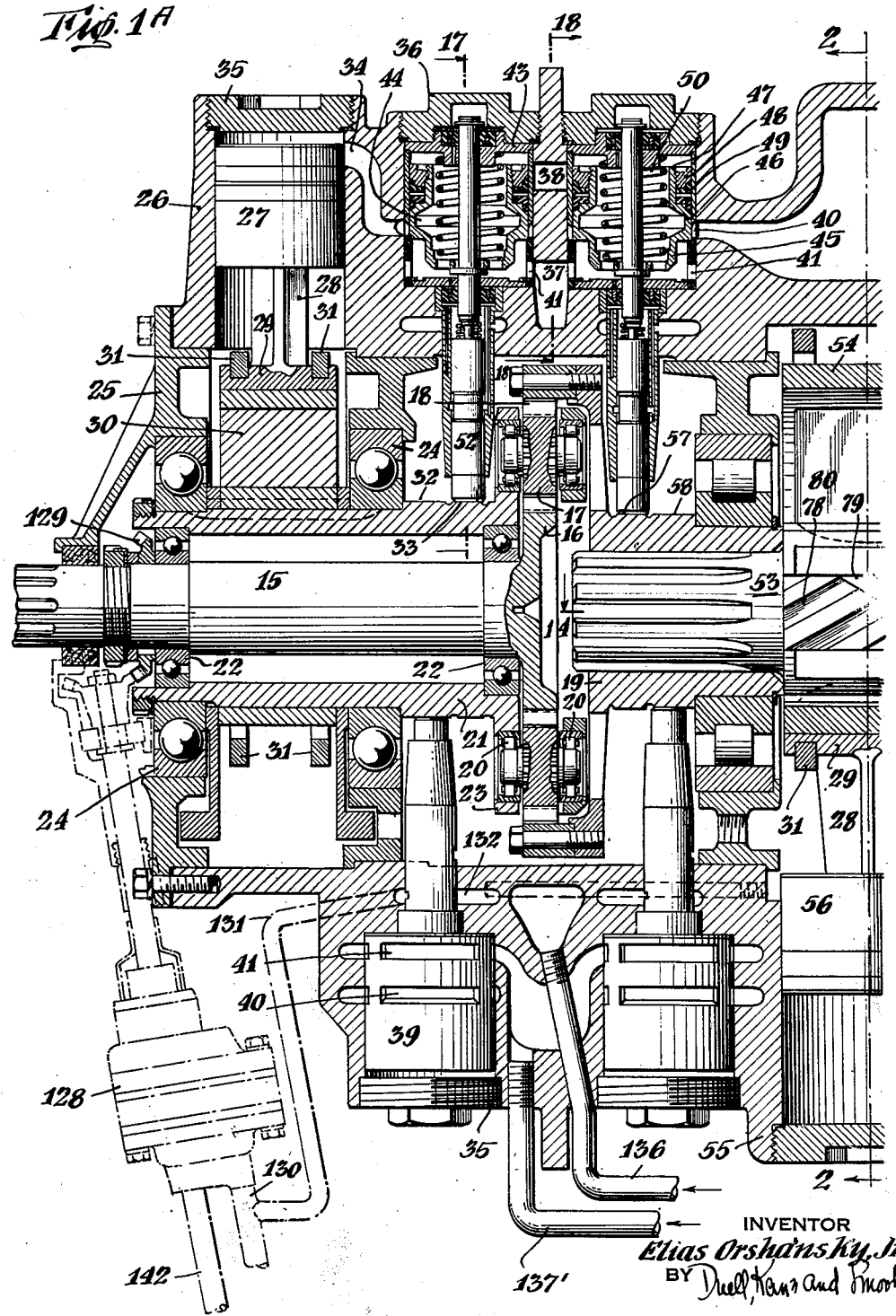

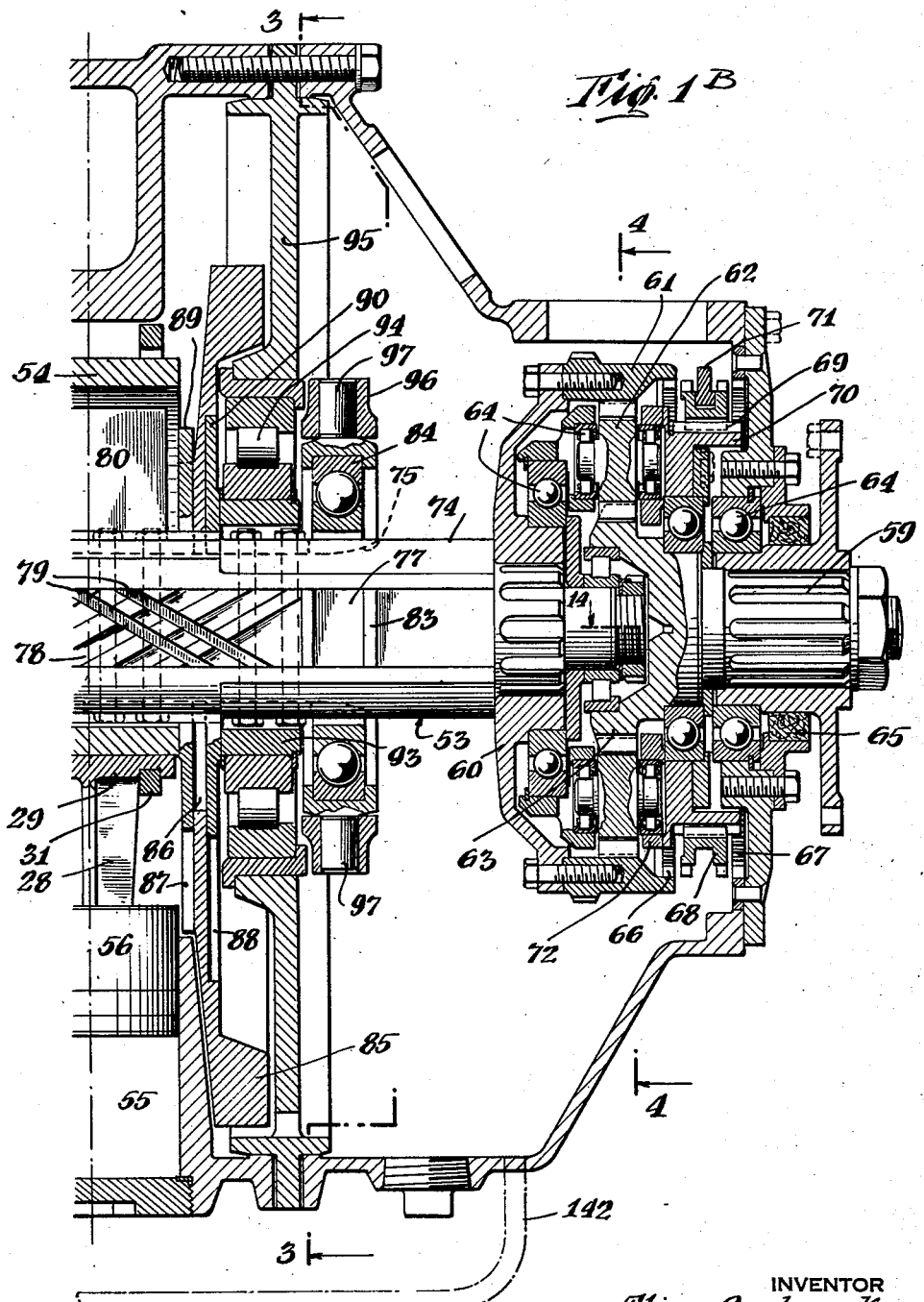

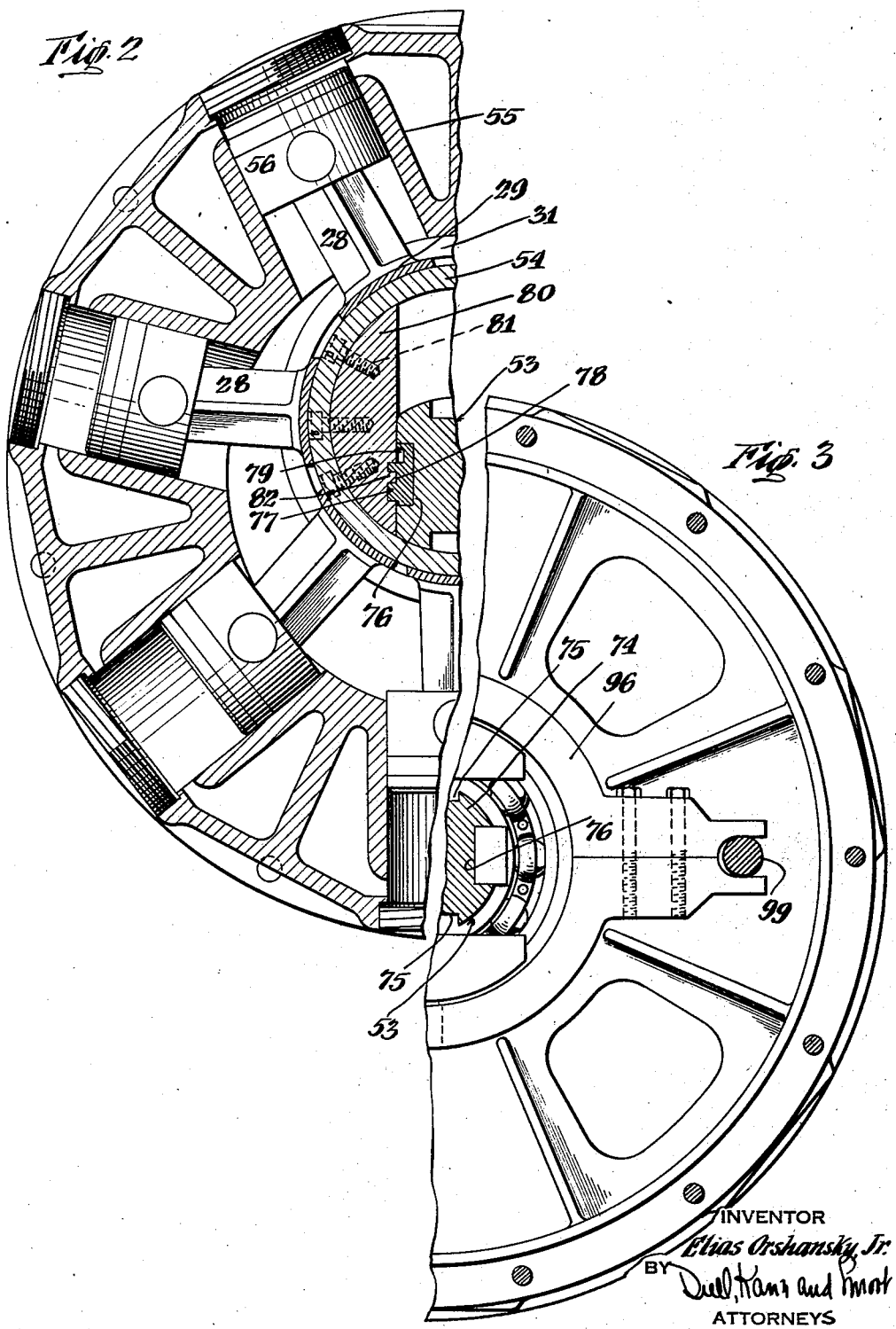

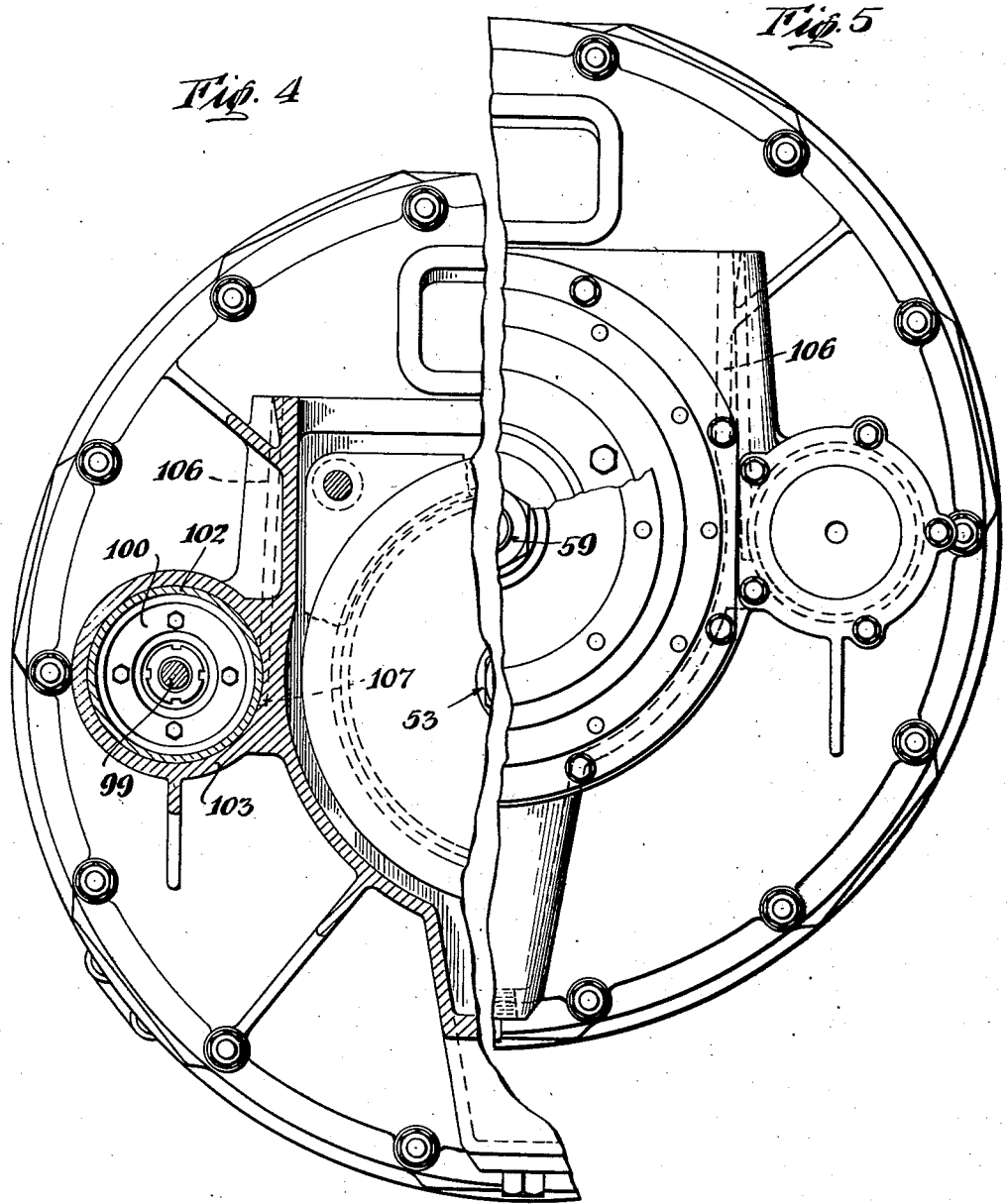

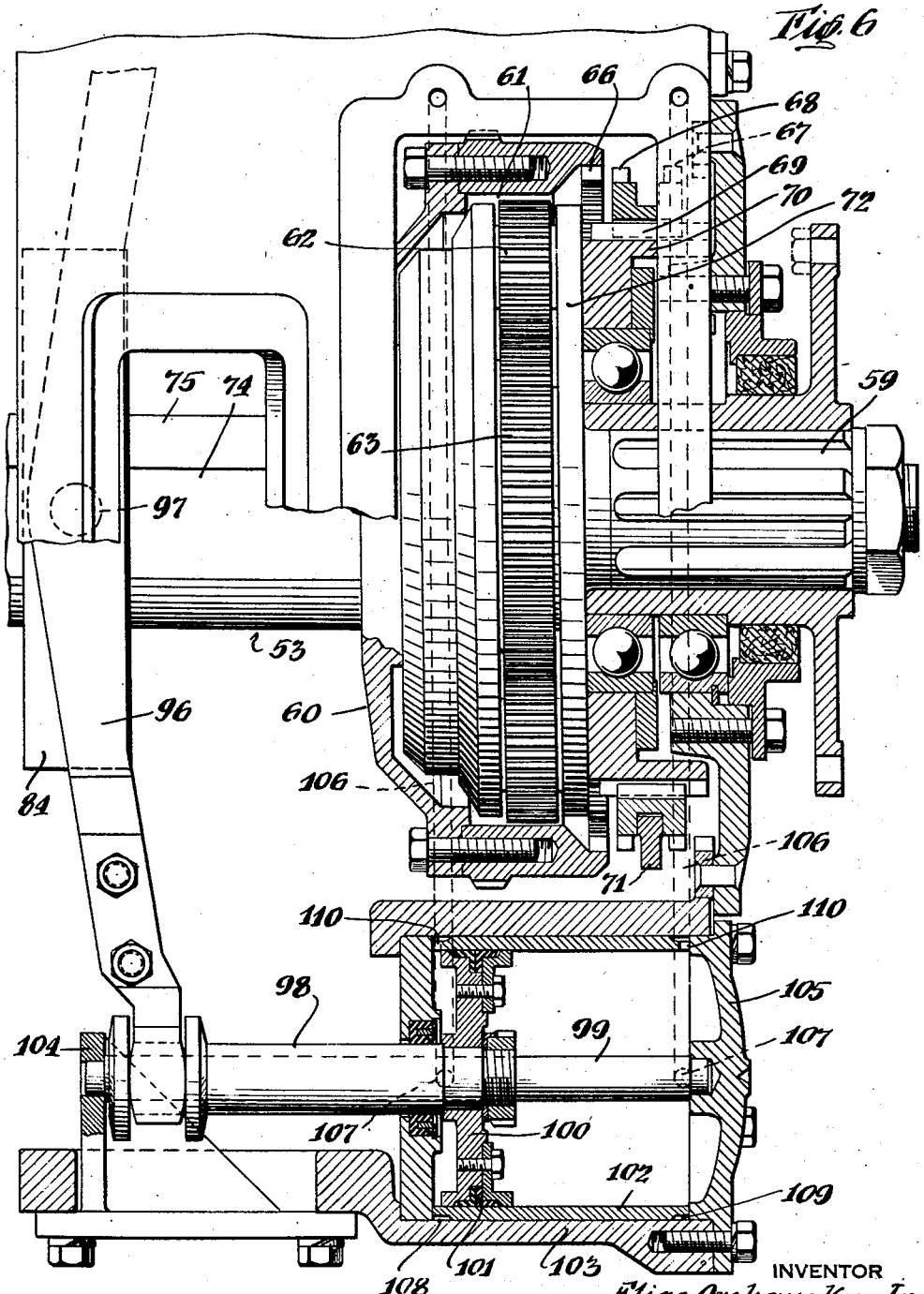

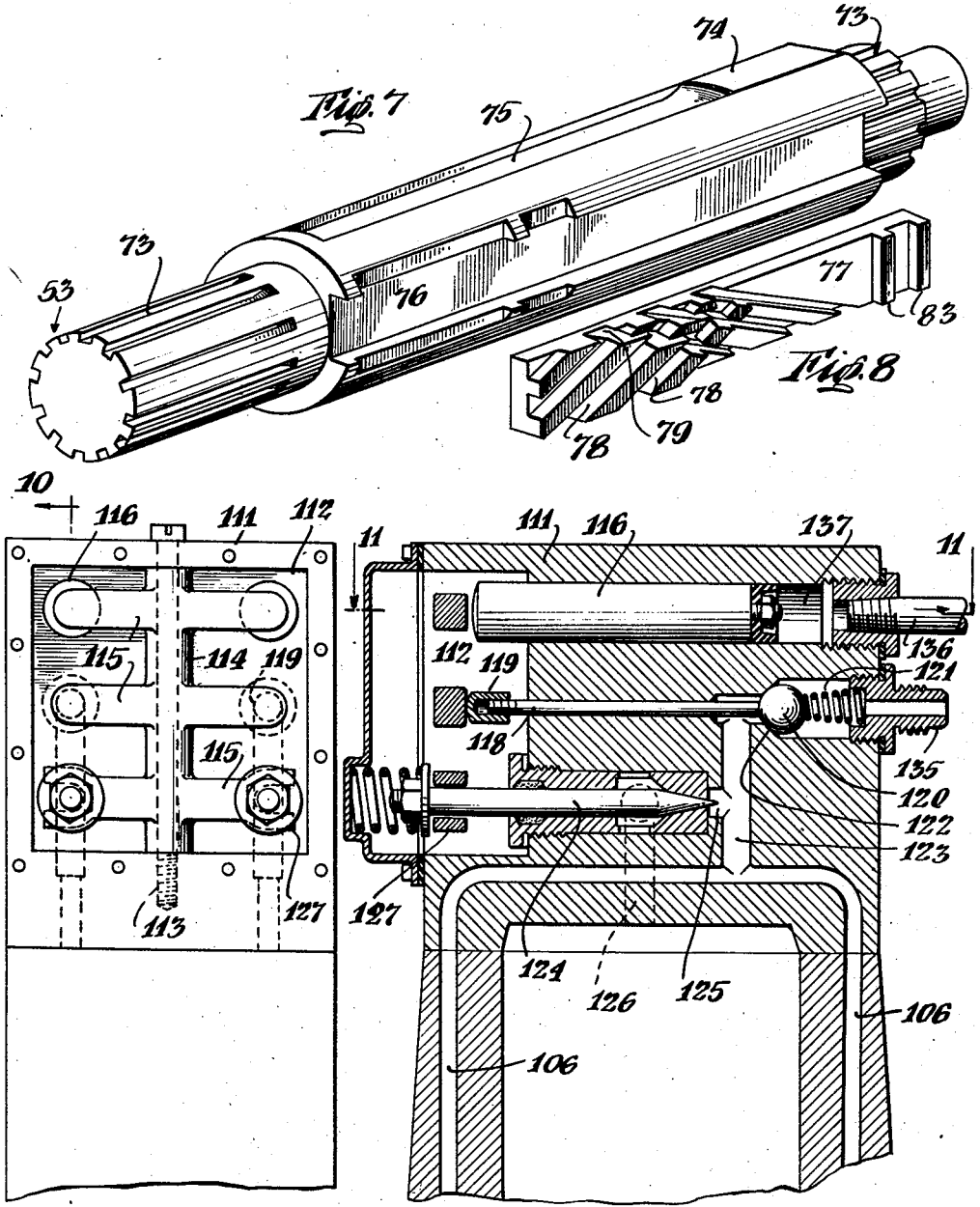

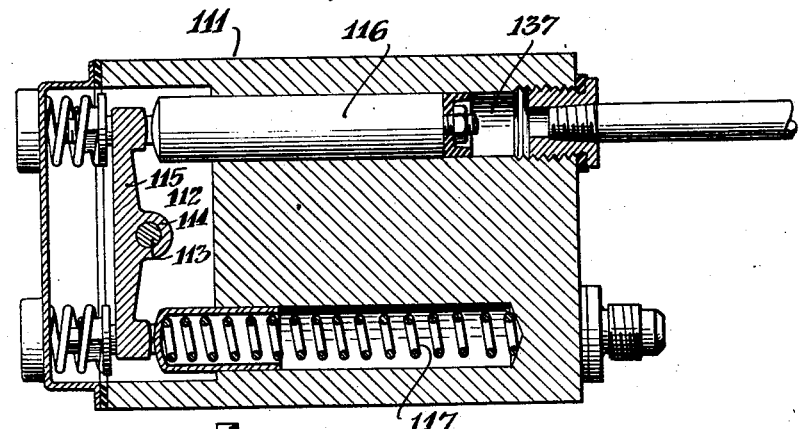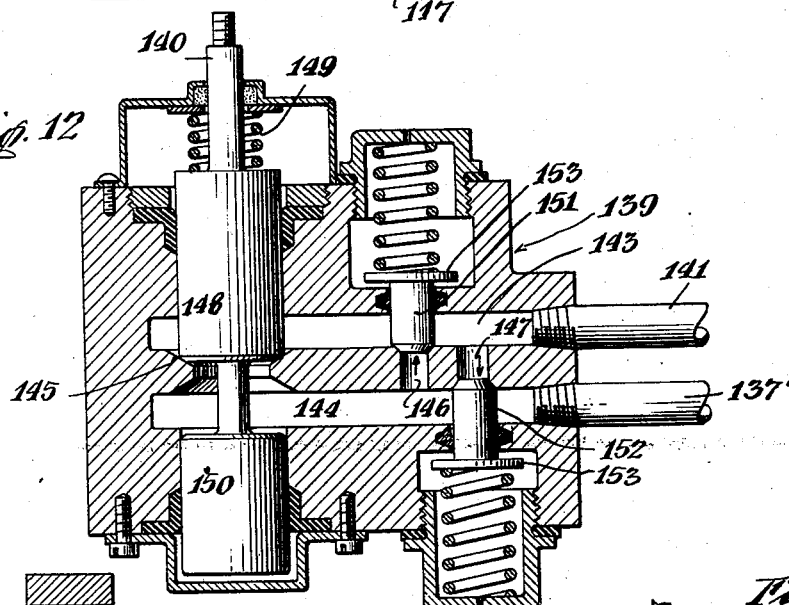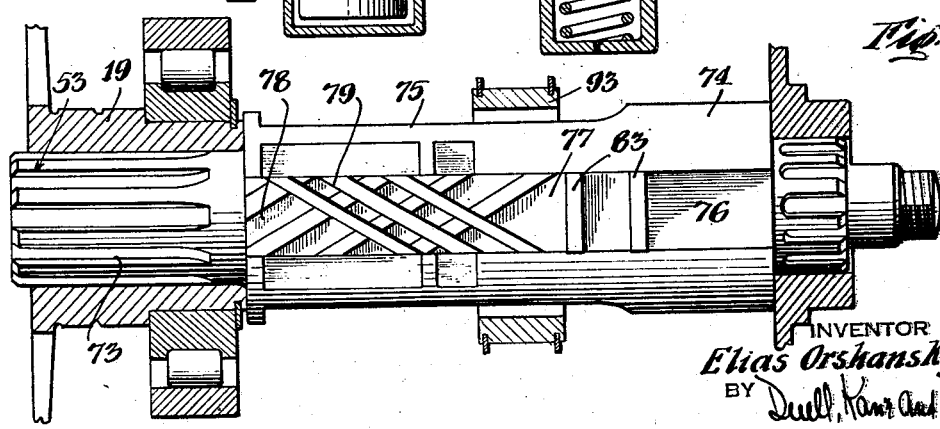

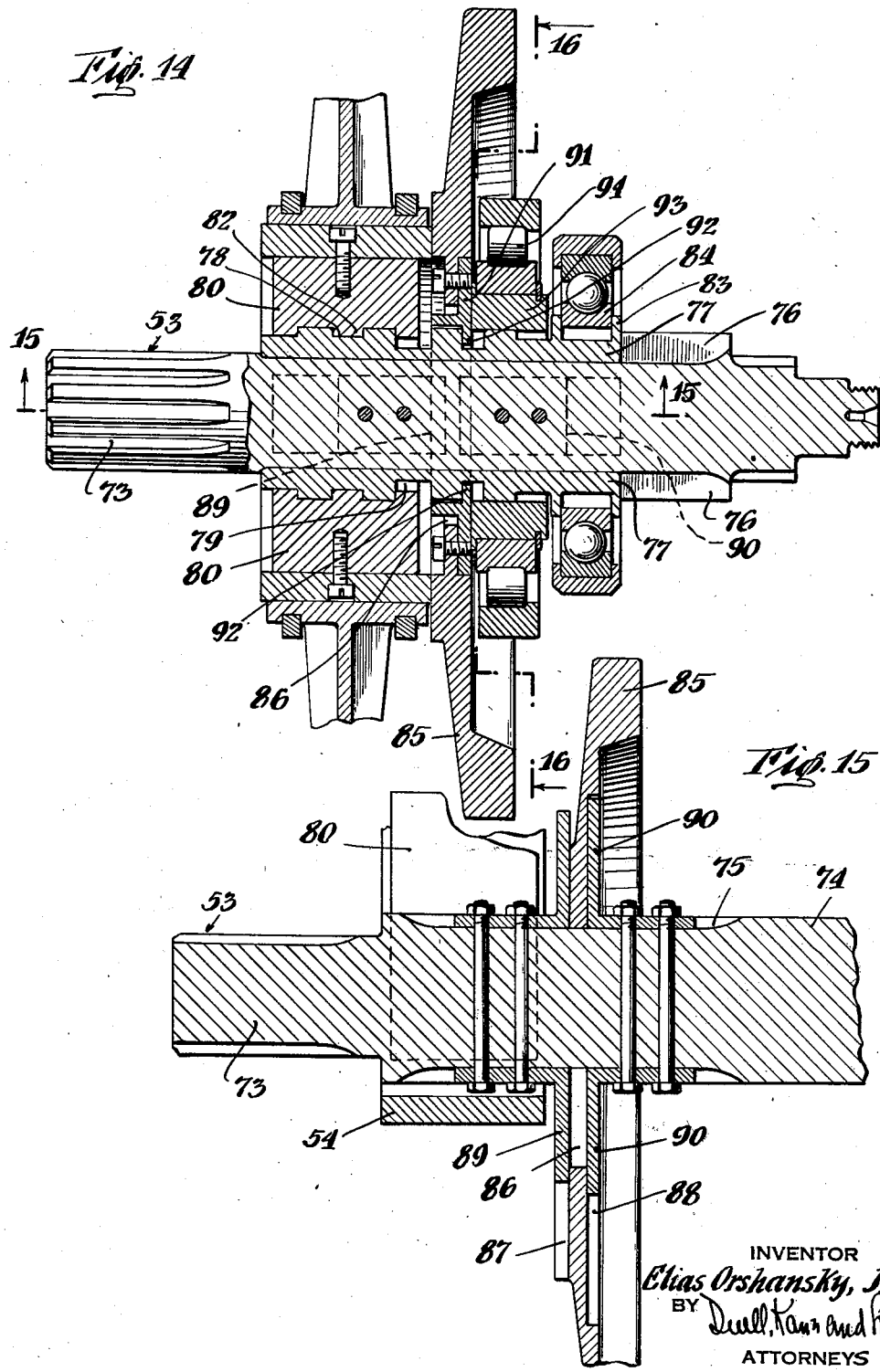

Sept. 16, 1941.  E. ORSHANSKY, JR  2,256,324
TRANSMISSION
Filed July 20, 1939  11 Sheets-Sheet 10
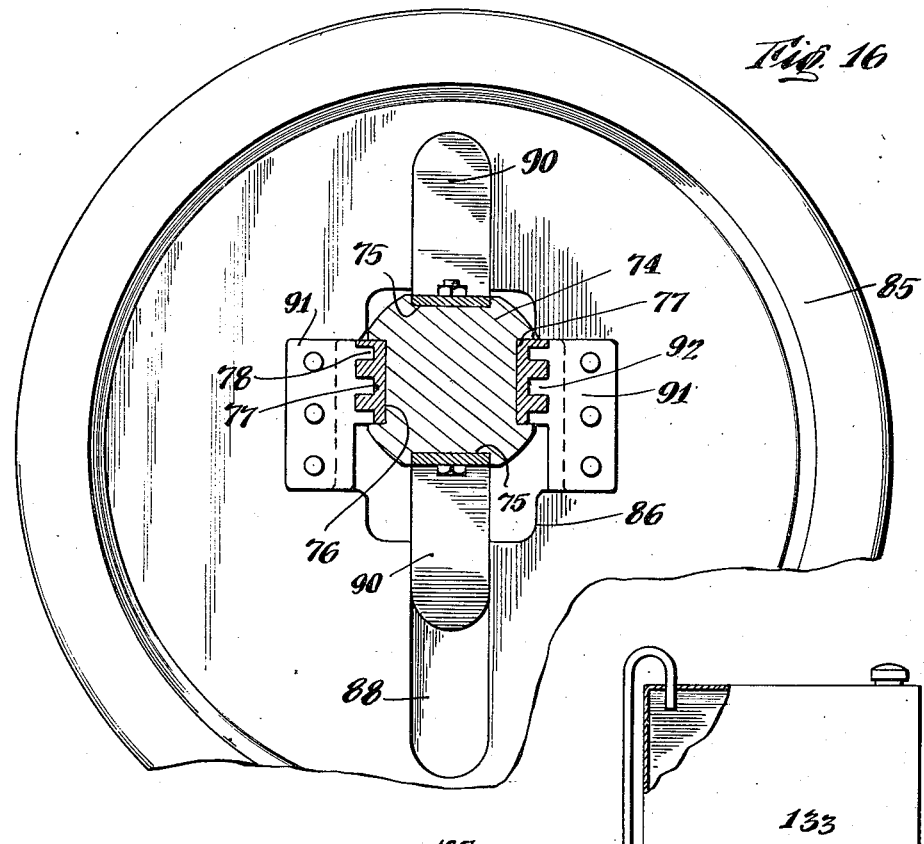
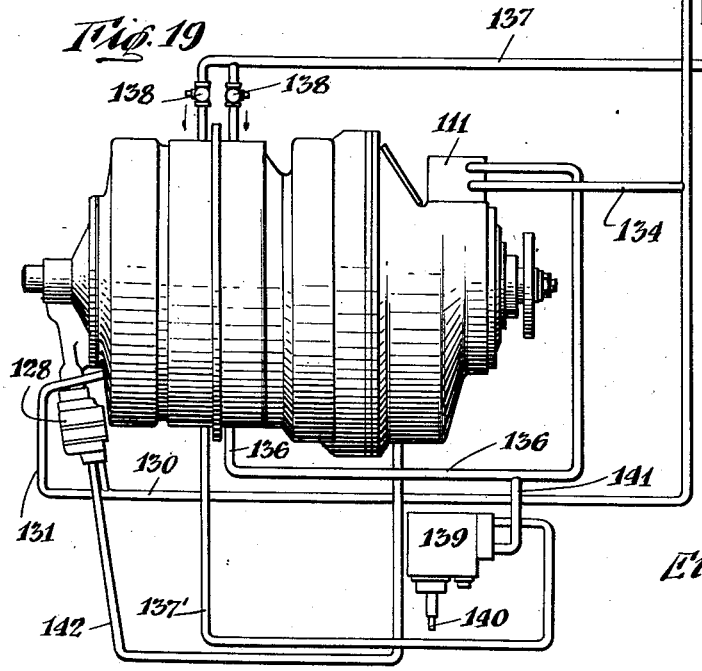
INVENTOR
Elias Orshansky, Jr.
BY
ATTORNEYS Sept. 16, 1941.  E. ORSHANSKY, JR  2,256,324
TRANSMISSION
Filed July 20, 1939  11 Sheets-Sheet 11

INVENTOR
Elias Orshansky, Jr.
BY
ATTORNEYS

Patented Sept. 16, 1941

2,256,324

UNITED STATES PATENT OFFICE 2,256,324

TRANSMISSION

Eliás Orshansky, Jr., University Heights, Ohio, assignor to The Acrotorque Company, Cleveland, Ohio, a corporation of Connecticut Application July 20, 1939, Serial No. 285,554

11 Claims. (Cl. 74—189.5)

This invention relates to a structurally and functionally improved transmission and in its more specific aspects aims to provide a hydro-mechanical transmission.

As such, it is an object of the invention to furnish an apparatus of this character which may be employed in connection with various types of mechanisms such as motor and rail vehicles, power shovels, machine drives and in other installations where it is desired to furnish driving and driven shafts or members and in which these elements may rotate through various speed ranges and in which the driven element will be operated with variable torque.

A further object is that of providing a unit of this type and which will embody a mechanism such that within the control of the operator, infinite variations in speed may be imparted to the driven element while the driving element or shaft has a substantially constant rotation.

A still further object is that of providing a hydro-mechanical transmission in which the aforementioned results may be achieved in an automatic or semi-automatic manner.

An additional object is that of constructing a unit of this type which, consistent with the achievement of the foregoing results, will embody a relatively simple and rugged construction, such unit being capable of operating under high pressures without danger to the mechanism.

With these and other objects in mind reference is had to the attached sheets of drawings illustrating practical embodiments of the invention and in which:

Fig. 1A is a sectional side view taken through the forward portion of a transmission;

Fig. 1B is a similar view taken through the rear portion of the transmission;

Figure 20:
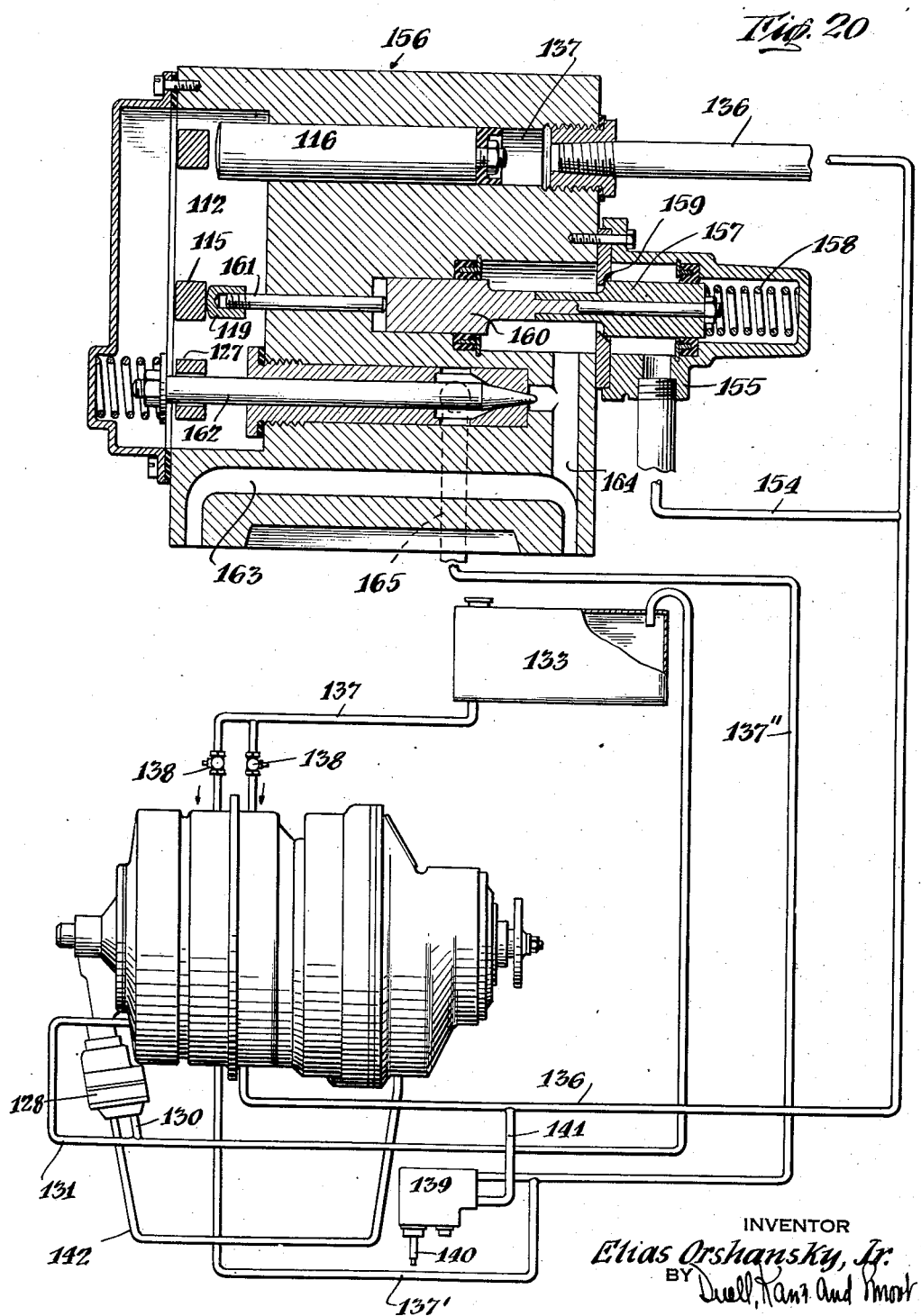

Figs. 2, 3, and 4 are transverse sectional views taken to one side of the center line of the transmission and along the lines 2—2, 3—3, and 4—4 respectively, and in the direction of the arrows as indicated in Figs. 1A and 1B;

Fig. 5 is a rear view of the transmission with certain of the parts broken away to disclose underlying constructions;

Fig. 6 is a sectional plan view taken through the rear casing portion of the transmission and showing partly in section and partly in elevation the mechanisms contained therein;

Fig. 7 is a perspective view of the primary driven shaft of the transmission;

Fig. 8 is a similar view of the control member associated therewith;

Fig. 9 is a face view of the control box or valve assembly by means of which the operation of the transmission is governed;

Fig. 10 is a transverse sectional view taken along the lines 10—10 and in the direction of the arrows as indicated in Fig. 9;

Fig. 11 is a partly sectional plan view of the mechanism as shown in Figs. 9 and 10;

Fig. 12 is a sectional plan view of a further valve assembly, forming a part of the unit;

Fig. 13 is a partly sectional side elevation of the units as shown in Figs. 7 and 8 and in assembled condition;

Fig. 14 is a sectional plan view taken along the lines 14—14 and in the direction of the arrows as indicated in Figs. 1A and 1B;

Fig. 15 is a sectional side view taken along the lines 15—15 and in the direction of the arrows as indicated in Fig. 14;

Fig. 16 is a transverse sectional view taken along the lines 16—16 and in the direction of the arrows as indicated in Fig. 14;

Figs. 17 and 18 are fragmentary enlarged sectional views taken along the lines 17 and 18—18 respectively and in the direction of the arrows as indicated in Fig. 1A;

Fig. 19 is a somewhat diagrammatic representation of the fluid circuit and pipe embodied in the unit; and Fig. 20 is a view similar to Fig. 10 but showing a modified form of construction and also illustrating somewhat diagrammatically the circuit and piping involved in connection with such a structure as distinguished from the circuit illustrated in Fig. 19.

Referring primarily to Figs. 1A and 1B, it will be seen that the numeral 15 indicates a driving shaft which may be coupled in any desired manner to a prime mover (not shown). This shaft has affixed to its inner end a gear 16 with which the teeth of a number of planet gears 17 mesh. Preferably six of the latter are employed and the teeth of these elements in turn mesh with the teeth of ring gear 18 secured to a hub 19.

Each of the planet gears may be mounted by antifriction assemblies 20. A collar or tube 21 is concentrically disposed with respect to shaft 15 and is mounted upon anti-friction bearings 22. The inner end of this tube terminates in a flange 23 within which assemblies 20 are fixed, so that as the latter have planetary movement, the tube or collar 21 is rotated. In addition to bearings 22 interposed between tube 21 and shaft 15, bearings 24 encircle the tube and serve to support the same with respect to the housing 25. A radial series of cylinders 26 is in turn supported by this housing and these cylinders as shown may be seven in number. Within each of the same, a piston 27 is disposed for reciprocation and to each of these pistons a connecting rod 28 is pivotally secured and terminates in an arcuate contact portion 29. These portions engage and are actuated by an eccentric 30. They are maintained against displacement with respect to the same, or each other, preferably by means of a pair of retaining bands 31 which encircle the contact portions 29 and ride within grooves formed in the outer faces of the same.

Collar 21 is formed with cam portions 32 and 33 to one side of the plane of the cylinders 26. Also, extending from the cylinders 26 are passages 34 and at this time it will be noted that the presently described cylinders as well as those hereinafter referred to, preferably have their outer ends closed by plugs or head caps 35. The passages 34 extend to chambers, the outer ends of which are closed by caps 36 and in turn extending from these chambers are passages or manifolds 37 and 38, the former being a high-pressure passage, while the latter is a low-pressure passage, the relative disposition of these manifolds being especially illustrated in Figure 18.

To govern the flow of fluid through passages 34, 37, and 38, valve mechanisms are disposed within the chambers afore referred to, these units being particularly shown in Figures 1A or 17. Each of these mechanisms are preferably contained within a liner 39 formed with ports 40 and 41. It is to be understood that for each of the cylinders 26, a pair of these valve mechanisms are provided. One of these mechanisms will have its port 41 aligned with passage 37 while the adjacent mechanism will have its port aligned with passage 38. Each of the valve assemblies will, of course, have its port 40 aligned with passages 34 of a given cylinder, and at this time it is to be appreciated that passages 37 and 38 are, in effect, manifolds common to all of the cylinders instead of being merely passages individual to the same.

Within each of liners 39 there is disposed a rod 42, the movements of which may be guided by extending in slidable contact with the surfaces defined by openings formed in outer and inner plates or disks 43 or through assemblies carried by the latter. A valve body 44 encircles rod 42 and preferably includes as shown an inner portion 45, an outwardly extending central portion 46, and an inwardly extending upper portion 47 upon which a clamping ring 48 is mounted. Between ring 48 and the outwardly extending central portion, packing 49 may be disposed in order to guard against the escape of fluid at this point. A spring 50 encircles rod 42 and bears against the reduced lower end portion 45 of the valve body so that such body is at all times maintained in contact with a collar or shoulder portion 51 associated with rod 42. Also, by means of this spring, the valve body tends to move into contact with its seat which is provided by enlarging the lower portion of the liner 39 and inwardly of port 41 so as to be contactible with the inner edge of the enlarged central portion 46 of the valve body. It is, of course, to be understood that these adjacent surfaces are ground so as to assure a proper contact which will provide an effective liquid seal even although high pressures are developed.

Interposed between the inner ends of rods 42 and cams 32 and 33 are elements 52 in the nature of tube portions. The structure of these elements may be best understood by referring to prior United States Patents 2,074,034, 2,098,115, 2,116,749, owned by the Eaton Manufacturing Company of Cleveland, Ohio. These patents exemplify the structure which is preferably embodied at this point.

With the foregoing in mind it will be understood that with shaft 15 rotating, gear 16 will be rotated to cause rotation of planets 17. If hub 19 offers relatively little resistance to turning, then it will be apparent that planets 17 will rotate and, therefore, shaft 15 will drive gear 16 and gears 17 to rotate gear 18 and consequently turn hub 19 in a direction reverse from that in which shaft 15 turns. This will occur due to the fact that tube or collar 21 will, of course, offer resistance to rotation because it drives the pump structure including the cylinder assembly 26.

Assuming now that hub 19 does offer resistance to turning, then it is apparent that as shaft 15 rotates to turn gear 16, the gears 17 will in addition to rotating have a planetary or orbital movement. In view of the fact that such movement will cause rotation of flange 23, tube 21 will be turned. This turning will result in reciprocation of the pistons 27 and simultaneous actuation of the valves which are operated by cam tracks 32 and 33. Alternate valves being connected to the high pressure and low pressure passages or manifolds 37 and 38 respectively, and the parts being properly timed, it follows that as any individual piston moves through its suction stroke, it will draw liquid through passage 34 from passage or manifold 38 and will then exert pressure on this liquid to expel the same through high pressure passage or manifold 37.

Hub 19 is coupled to a driven member generally indicated at 53, the detailed construction of which is especially shown in Figures 7, 8, and 13, and which will be hereinafter described. This member is encircled by a cam 54 in the form of a ring, this cam being coupled to member 53 in a manner hereinafter brought out. Encircling cam 54 are a series of radially extending cylinders 55 within which pistons 56 reciprocate, these pistons actuating cam 54 and the assembly being generally similar to that heretofore described in connection with the structure identified by numerals 28 to 31 inclusive. At this time it will also be observed that hub 19 is provided with cam portions 57 and 58 which actuate high and low pressure valves respectively for each of cylinders 55. These valves preferably correspond in structure identically with the valves heretofore described in association with the pump embracing the cylinders 26. For this reason the same reference numerals have been employed to identify similar parts in all valves and regardless of whether the latter are associated with the pump as shown in Fig. 1A or the hydraulic motor comprising cylinders 55 as shown in Figs. 1A and 1B.

It being assumed that cam 54 is coupled to member 53 and that the several parts are correctly timed, it will be apparent that as the pump is operated, liquid will be forced under high pressure into manifold or passage 37 and will be admitted by the valves associated with the motor to those cylinders of the latter within which pistons are performing a working stroke. Thus, the motor will, through cam 54 or any equivalent structure coupling the same to driven member 53, serve to rotate the latter.

Consequently if the load on member 53 is slight, an operating condition will prevail which will substantially result in shaft 15 driving hub 19 and member 53 through gears 16, 17, and 18 and in a direction reverse to that in which shaft 15 rotates. If resistance to movement on the part of member 53 exceeds the force required to operate the pump, pistons 27 will be reciprocated incident to the orbital movement of gears 17 and consequent turning of tube 21. Accordingly, fluid under pressure will be pumped to the motor and the latter will assist in rotating member 53. Of course, as soon as this member begins to rotate, a certain amount of driving force will be transmitted through gears 16, 17, and 18 and, therefore, a mechanical drive will be established which will supplement the efforts of the hydraulic drive. In fact, as the torque decreases, the mechanical drive will increasingly supersede the hydraulic drive until finally a condition may be approached such as has been afore outlined when it was assumed that the resistance to turning offered by member 53 was less than that required to operate the pump.

A factor which contributes to the greatest extent to the commercial and successful operation of this unit is that the latter is in effect leak-proof. In other words, cylinders 26 each have merely one outlet, to wit, the passage 34. Each of the valves associated with both the pump as well as the motor are also in effect leak-proof by virtue of the line seal incorporated therein by providing a ground seat as aforedescribed. Losses will be reduced to a minimum because each of these valves is moreover of a balanced nature. In other words, fluid under pressure may freely enter the casing 39 of any proper valve and pass upwardly through the openings into the valve body to thus act against all surfaces. Consequently, these valves are not required to act as pistons or against a head of fluid under pressure, but may freely function as rods 42 are moved against the relatively minor resistance offered by springs 50.

It is to be borne in mind that member 53 will be rotating in a direction opposite to the rotation of shaft 15, and while not essential, it is usually desirable that the ultimate driven shaft or element 59 shall rotate in the same direction as that in which shaft 15 rotates. With this thought in mind, there is affixed to the outer or rear end of member 53 a plate 60 which has coupled to it a ring gear 61. The teeth of the latter mesh with planets 62 which in turn mesh with a sun gear 63. This sun gear is integral with or coupled to the driven element or shaft 59. Anti-friction bearings 64 may be provided at suitable points so as to rotatably support the several elements and also as shown, an oil packing 65 may be interposed between the housing and the shaft 59.

Finally with respect to this portion of the structure, it is to be observed that the rear edge of the ring gear 61 may be provided with a clutch portion 66 while a similar brake portion 67 may be affixed to the housing of the transmission. A clutching element 68 may be engageable with either of these clutch or brake portions and be slidably mounted as at 69 upon a member 70. Selective coupling between the element 68 and clutch and brake portions 66 and 67 may conveniently be provided for by a shifting fork or member 71, and at this time it is to be noted that the element 68 may in effect form a continuation of the cage 72 which supports the planets 62.

With the parts in the position shown in Figures 1A and 1B, and assuming member 53 to be rotating in a given direction, it will be understood that no drive will be imparted to the driven shaft 59 in that ring gear 61 will simple rotate to rotate the planets 62 which will merely have orbital movement around sun gear 63. Thus, with the slightest resistance to movement on the part of shaft 59, no drive will occur.

As clutching element 68 is shifted to the left as viewed in Figures 1B and 6, the movement on the part of ring gear 61 will result in corresponding movement on the part of element 68; this movement will in turn result in movement being imparted to member 70 which forms a part of the planet cage. Thus, this cage will be caused to rotate in synchronism with member 53 and no movements will occur between planet 62 and ring gear 61. Consequently, there is in effect provided a rigid coupling between member 53 and driven shaft 59 and the latter will rotate in the same direction as member 53. This would ordinarily be desirable where a "reverse" drive is to be effected by the transmission.

Where, however, a "forward" drive is to be achieved (i. e. one in which shaft 59 is rotated in the same direction as shaft 15) the operator will simply engage element 68 with brake teeth or portion 67. Under these circumstances, the assembly is prevented from having orbital movement. It follows that as ring gear 61 rotates, the bodies of the planets 62 will correspondingly rotate to turn in a reverse direction the sun gear 63 and the shaft 59 in order to achieve the results desired.

As afore brought out, it is apparent that the fluid flows substantially without any obstruction or diminution in pressure or flow to the motor, and that both of these units are of the positive displacement type. In order that variable torque may be achieved, it is intended that the internal capacity of the motor may be capable of being varied in order that the latter may serve as a metering device for the pump. Now, in order to achieve this result, the cam ring 54 will, according to the present invention, be capable of being shifted so that its degree of eccentricity with respect to the axis of member 53 may be varied. The structure by means of which this result may be achieved may be best understood by referring to Figures 2, 7, and 13 taken in conjunction with the first figures.

In Figure 7 it is primarily to be observed that member 53 may conveniently include end portions 73 to which hub 19 and plate 60 are respectively secured. Its central portion is generally angular as indicated at 74 and has formed in it a pair of flattened and preferably recessed surfaces 75 which are oppositely located, as well as a pair of grooves or track-ways 76. Mounted for sliding movement within the latter is a block 77 which is formed with a series of angularly extending grooves 78 as well as a series of tangentially extending and intersecting grooves 79 which may be deeper than grooves 78.

Disposed to each side of the central body portion 74 are members 80 which have their outer faces curved as is especially shown in Figure 2. These members are fixedly secured as, for example, by bolts 81 to the inner face of ring 54. The inner faces of these members 80 are provided with grooves defining tangentially extending ribs 82 riding within grooves 78. It is, of course, to be understood that blocks 77 are disposed one within each of the grooves 76. Consequently, the cam ring 54, members 80 and 53 provide in conjunction with blocks 77 a unitary structure. Moreover, with the cam maintained against shifting longitudinally of member 53, and with the blocks shifting in such directions, the members 80 will be projected and retracted with respect to the axis of member 53 to vary the eccentricity of the cam ring. While, of course, such variation may be throughout any desired range, it is preferred that with the blocks in one extreme position, the eccentricity of ring 54 will be neutralized, i. e., the latter will be concentrically and evenly spaced from the axis of member 53, while the opposite extreme position of the parts is shown in Figure 2.

As heretofore described, it is obvious that member 53 will be incapable of longitudinal shifting within the unit. Likewise, ring 54 will be incapable of such shifting due to the manner in which it is mounted and forms a part of the fixed motor structure. Accordingly, if blocks 77 are, for example, coupled by means of ribs 83 with an anti-frictional bearing 84 and the latter is shifted longitudinally of member 53, members 80 will be projected and retracted as afore described. It is also apparent that if the eccentricity of the motor operating ring or its equivalent is varied to a greater or lesser extent, the unit would become unbalanced.

Now with a view to avoiding any such result, it is preferred to employ a counter-balance of, for example, the type shown in Figures 1B, 14, 15, and 16. In these views the numeral 85 indicates a disk or wheel which may have its periphery thickened and which is formed with a relatively large central opening 86. Both faces of this disk are grooved as shown at 87 and 88, the former groove preferably having its ends open. Bracket elements in the nature of angle irons 89 and 90 are secured to member 53 and are mounted in opposed pairs within the recessed surfaces 75. The disk 85 is mounted for sliding movement between these pairs of brackets and by introducing the outwardly extending arms of the same within grooves 87 and 88 respectively. Affixed to the disk 85 are a pair of bracket elements 91 which have projecting portions 92 riding within groove 79 of blocks 77.

Incident to the brackets 89 and 90, disk 85 may not shift longitudinally of member 53. As a consequence if bearing 84 is shifted as afore described to slide blocks 77 along member 53, bracket portions 91 will cause the eccentricity of member 85, with respect to the center of member 53, to be varied. With the parts mounted as shown, the eccentricity of the disk will be increased as the eccentricity of ring 54 is increased, it being of course understood that the outermost surfaces of these elements will be spaced one hundred and eighty degrees. As the blocks are shifted in an opposite direction, the eccentricity of the disk 85 will be decreased simultaneously with the decrease in eccentricity of ring 54. Thus, a counter-balance is provided and the action of which is increased or diminished in proportion to the diminution or increase in eccentricity of the motor operating element and both of these parts are actuated simultaneously by a single operating member.

As will be observed especially in Figures 1B, 13 and 14, a bearing supporting ring 93 encircles member 53 and clears the flattened or recessed surfaces 75 as well as the structure contained within the same. An anti-frictional bearing 94 may be associated with this ring and a web 95 may extend from the main casing portion of the unit and in turn support the outer element of this bearing. Consequently, member 53 will be properly mounted between its forward anti-friction bearing and the rear bearing just described. This, however, will occur without in any way interfering with the operation of the blocks or the associated structures.

Now with a view to providing a mechanism which will serve to shift bearing 84 and block members 77, it will be observed that as shown in Figure 6, it is preferred to employ a yoke 96 which may extend above and below the bearing and to each side of the same. By means of pin 97 this yoke is rockingly coupled to the bearing and each end of the yoke is coupled to a piston rod 98 in the form of a sleeve encircling a guide rod 99. Only one of the latter assemblies has been illustrated in that the second of the same involves a mere duplication, and as will be seen, still referring to Figure 6, a piston 100 provided with suitable packing 101, is slidably enclosed within a liner 102, in turn enclosed by a cylinder structure 103. The opposite ends of rods 99 may be supported respectively in a bracket 104 and the head 105 of the cylinder. The outer faces of the liner may be grooved to provide passages 108 and 109 having openings 110 communicating with the interior of the liner and within which the piston reciprocates. Portions of the casing may be formed with passages 106 terminating in outlets 107 registering with the passages 108 and 109 formed in the liner 102. It follows that if fluid under pressure is forced through one of the passages 106 and vented through the second of the same, the pistons will be moved in one direction, while if the reverse is true, they will be moved in an opposite direction. Such movements will, of course, correspondingly shift the yoke 96 to move bearing 84 and blocks 77. Due to the coupling extending between the yoke and the bearing, it will be understood that even if the movement of one of the pistons lags behind the movement of the other of the same, no binding of the parts will occur because the yoke will equalize this action.

Now to control the flow of fluid through passages 106, a valve structure is employed and which is enclosed within a casing 111 applied to the main casing as best shown in Figure 19. The interior of this valve is best illustrated in Figures 9, 10 and 11. As shown, a recess 112 may be provided within the body 111 and extending vertically of this recess a shaft 113 may be mounted. The latter is encircled by a sleeve 114 provided with three pairs of arms 115. In line with the arm of one of these pairs is a piston 116 and in line with the second arm of this pair is a spring 117, the compression of which may be adjusted in any desired manner (not shown). In line with the next pair of arms are rod 118 which may mount adjustable head portions 119. Adjacent the inner ends of these rods are ball valves 120, spring pressed as at 121, and cooperable with seats 122. The latter defines the entrance to a branch passage 123 coupled to one of the pairs of passages 106. So that no misunderstanding may occur, it is at this time to be emphasized that as shown in Figure 10, one of the passage portions 106 communicates, for example, with the forward end of one cylinder liner 102, while the other of the same communicates with the corresponding end of the second cylinder liner.

As illustrated in Figure 9, each one of the second pair of arms contacts one of a pair of rods 118, while the arms of the third pair are adjustably coupled to spring pressed valve elements 124 which guard against the flow of liquid from branch passage 125 to branch passage 126.

Consequently, with sleeve 114 rocked in one direction, rod 118 may be moved to unseat valve 120, but due to the forked connection 127 existing between the third arm and valve 124, the latter will not be unseated. However, the complementary rod portion 118 and valve 124 cooperative with the opposite arms of the second and third pair will under these circumstances function so that valves 120 and 124 controlled by them will be respectively maintained in seated condition and unseated. These latter valves serve to control the flow through passages precisely as may occur in the structure in Figure 10, excepting that these passages 106 are coupled, for example, to the rear or outer ends of the cylinder liners.

Now referring back to Figure 1A in conjunction with Figure 19, it will be observed that while not essential it is preferred to employ what might be termed an auxiliary pump 128 which may be driven by a gear 129 affixed to shaft 15. This pump is a relatively low pressure unit and is provided with an outlet 130 from which a branch 131 extends to recesses 132 forming a part of the main casing enclosing elements to supply lubricant to the same. Outlet 130 is continued as in Figure 19 and extends to a pressure tank 133 which may be located above the plane of the transmission. Outlet conduit 130 may also be furnished with a branch 134 connected one to each of the fittings 135 (one of which is shown in Figure 10). Moreover, as shown in Figure 1A, tubes 136 and 137' are connected respectively to the high pressure and low pressure manifolds. The former tube continues as shown in Figure 19 and is coupled with the inner end of cylinder 137 within which piston 116 is movable.

Consequently it follows that if very little pressure exists within the high pressure manifold and as would be the condition if the unit were subjected to relatively little torque, the pressure within tube 136 would be inadequate to project piston 116, and accordingly spring 117 would be free to force a retraction of the piston through the upper pair of arms 115. Under these circumstances one of the rods 118 would be projected to unseat the valve associated therewith, while the adjacent valve 124 would remain seated. Conversely the opposite rod 118 and valve 120 would remain seated, while valve 124 would be unseated. Thus, fluid would be vented from one of the ends of cylinders 102—103 through a pair of the passages 106, the branch passage 123, past the valve 124, and be discharged through branch passage 126. However, fluid under pressure would be introduced into the opposite ends of the cylinders incident to the unseating of valve 120 which would permit liquid under pressure to flow through fitting 135, branch passage 123, and passages 106. This would have the result of causing both pistons 100 to be shifted to their extreme positions and to correspondingly move yoke member 96 and blocks 77 to cause a minimum condition of eccentricity of the pump, rotor, and counter-balance.

If, however, the parts have been operating under substantially these conditions and, for example, the torque on the unit increases (as would be the case if the load on the driven shaft were increased for some reason) it is obvious that the pressure within the high pressure manifold would increase. Accordingly, liquid under pressure would be forced through tube 136. This pressure will result in the piston 116 being projected to compress spring 117. Of course, it will be appreciated that the compression of this spring will be most carefully adjusted for each given installation and so that the controls act automatically and in such manner that they correlate the entire transmission to the torque load. Thus, with spring 117 compressed, the arms 115 are rocked in a manner opposite from that just described. Under these circumstances, the valve 120 which has just been considered, remains closed and valve 124 which has just been considered, is open. Conversely, the complementary valves 120 and 124 coupled to the opposite arms of the last two pairs, are respectively opened and maintained in closed positions. This will have the obvious result of allowing liquid which has heretofore been forced under pressure and to one side of the pistons 100 to be discharged through the passages 106, past valve 124, and through passage 126. At the same time, fluid under pressure will be introduced to the opposite sides of the cylinders by flowing past valve 120 which has been unseated. Consequently, yoke 96 will now be shifted to correspondingly move blocks 77. This will cause an increase in the eccentricity of ring 54 with respect to member 53, or in other words, the strokes of the motor pistons will be increased in range. As a consequence of this increase of internal capacity on the part of the motor, the torque developed by the unit will be increased and when a pressure condition within the high pressure manifold is established such that spring 117 maintains the piston 116 in normal position, no further variation in eccentricity will occur. Also as heretofore traversed, as soon as the load on the unit decreases to a sufficient extent, spring 117 will cause a retraction of piston 116 so that the internal capacity of the motor will again be adjusted resulting in a maximum speed of rotation on the part of the driven shaft. With each such adjustment, it will of course be understood that a corresponding adjustment of the counter-balance occurs so that a substantial condition of static and dynamic balance is maintained.

By the provision of pump 128 the sump level is maintained and all parts of the apparatus are adequately lubricated. Moreover, with the provision of this pump, a priming function is achieved. This is quite aside from the fact that the pump in the embodiment under consideration serves as heretofore described to operate the controls. The tank 133 may be, for example, under a pressure of twenty pounds to the inch and with a view to distributing any surplus liquid, a pipe 137 may extend from the tank to the manifolds. This pipe may have interposed within it check valves 138 such that there will never be any danger of fluid flowing in a direction other than that indicated by the arrows in Figure 19.

It is obvious that there must be provided within the control of the operator a mechanism such that the drive from shaft 15 to driven element 59 may be interrupted. To this end a control casing 139 may be furnished from which a control rod 140 extends. This rod may be coupled to a lever or pedal so that it may be conveniently projected by the operator. As will be observed, the feed line 136 extending from the high pressure manifold may conveniently be provided with a branch 141 coupled to casing 139 and lead 137' is also coupled to this casing. At this time it is also to be noted that a return line 142 is coupled to pump 128 and connects to the sump within the main casing of the apparatus.

Attention is next directed to Figure 12 in which it will be noted that the interior of casing 139 has been shown. As illustrated a passage 143 connects with high pressure line 136 while a passage 144 communicates with line 137'. A passage including a valve seat 145 affords communication between passage 143 and 144 and further passages 146 and 147 are also furnished to extend between the first named passages. A valve 148 having a line-seal contact cooperates with seat 145 and a spring 149 normally maintains this valve on its seat. A guiding piston or plunger 150 forms a part of valve 148 and extends into a bore in line with the axis of the valve seat 145.

It follows that with passages 146 and 147 sealed, an operator by simply raising the rod or actuating member 140 against the action of spring 149, will permit fluid to flow from pipe 136 through pipe 137'. Consequently the pressures in the high and low pressure manifolds will be equalized and no power will be transmitted by the pump to the motor. Under these circumstances no drive will be transmitted from shaft 15 to driven member 59. When it is desired to again rotate the driven member this may be accomplished by simply releasing the rod 140 or its equivalent. Such release will allow valve 148 to move onto seat 145, thus again isolating the high and low pressure manifolds from each other and permitting the unit to function as aforedescribed.

Spring pressed plungers 151 and 152 normally seal passages 146 and 147. Each of these plungers have head portions 153. In certain instances when valve 148 moves to its seated condition, surges or pressure impulses will be developed within the unit and if not counteracted would result in a series of impulses being transmitted to the driven member. This obviously would be objectionable. The plungers 151 and 152 will serve to counteract this in that any sudden increase of pressure within passages 143 and 144 would result in a certain amount of liquid acting against the ends of these plungers, and this action would open passage 146 or 147 to a greater or lesser extent to by-pass what might be termed the peaks of the pressure surges and thus cushion and smooth out the operation of the unit. The reason for providing plungers in association with both the high as well as the low pressure manifolds is because under certain circumstances the apparatus to which the driven end of the transmission is coupled may in effect be driving back through the transmission towards the prime mover. Under these circumstances it is possible that high pressures would be developed in what is normally the low pressure manifolds so that in effect the motor would be operating the pump. It is under such circumstances that plunger 152 functions.

While under most conditions it is preferred to employ a supplementary or auxiliary pumping unit 128, this unit may be dispensed with and the fluid pressures developed within the transmission itself. Also, under certain circumstances the auxiliary pump may be utilized solely for the purposes of maintaining the sump level, feeding the tappets or elements 52 and priming the apparatus without being utilized for control purposes. Such a construction has been shown in Figure 20 in which the high pressure line 136 is connected by a branch 141 to the control casing 139 as heretofore described in connection with Figure 19. Also, as heretofore described, this line connects with the cylinders within which piston 116 is disposed. However, in this view a branch 154 is employed which communicates with the interior of a valve casing 155 forming a part of the main casing which in this view is designated as 156. Within casing 155 a valve 157 is mounted, such valve being normally spring pressed as at 158 into contact with the seat 159 in conjunction with which it forms a line seal. A stem 160 projects beyond the valve body 157 and is engageable with a rod or tappet 161 corresponding in function to rod 118 described in connection with Figure 10. Also similar to the structure employed in that view, a pair of valves 162 are employed which are spring pressed and correspond to valves 124. These valves control the flow of liquid through a passage 163 and a branch to a passage 165 which is coupled to the return line 137'.

Thus, it is obvious that according to the movement of piston 116, the pairs of arms will be rocked. Movement of the center pair of arms will result in an unseating of one of the valves 157, allowing a flow of liquid from branch 154 to passage 164 and so into passages 106. Simultaneously the opposite valve 162 controlled by the third pair of arms will be withdrawn from its seat and will allow a flow of liquid from the cylinders through passage 106 and passage 164 to passage 165 and thence through line 137". This will vent that end of the cylinders which is connected to the latter pair of passages 106.

It is believed that as a result of the foregoing review it would be merely repetitious to traverse again the several phases of operation of the unit as included in the transmission. Suffice it to say that there is herein provided a hydro-mechanical transmission embodying functional and structural improvements and which may be employed to drive a shaft or other member in a forward or reverse direction and under varying conditions of torque while for example—although not necessarily—the driving shaft or prime mover maintains a substantially constant R. P. M. and develops a predetermined amount of driving force. Proportional to the load placed upon the transmission, the latter will automatically vary the internal capacity of and driving force exerted by the motor. Consequently, the operator will not have to concern himself with constantly and accurately adjusting the motor to serve as a metering device for the pump. However, the operator may bring the driven shaft to a complete standstill by simply actuating the control 140 to permit a flow direct from the high pressure to the low pressure manifolds.

It is believed wise, however, to preferably touch on the functional aspects of the drive. In other words, assuming that the driving shaft is rotating in a clock-wise direction, it is obvious that this may result in similar rotation of the planetary carrier in order to start a driving of the pump. Due to the fact that under these circumstances, the hydraulic motor will have maximum capacity, or in other words, its eccentric will present a maximum throw, a rotation of the motor will occur. This in turn will result in a rotation of the driven shaft. Due to the manner in which the valves are timed, such rotation— as shown in the drawings—will be in a counter clock-wise direction. Similar rotation will be imparted to the orbit gear. In the gear unit, clock-wise rotation of the sun gear and counter clock-wise rotation of the orbit gear will cause the carrier member to approach and finally reach zero rotation. This, of course, will only occur as the load diminishes due to the increase of momentum of the vehicle and especially in the case of light load being involved. Of course, if the transmission encounters a load condition such, that acceleration beyond a predetermined point may not be achieved, then the carrier will not reach zero rotation. However, assuming that the transmission functions in a manner such as would be encountered under ordinary load and road conditions, it will be understood, that the pump will finally have a zero output and the motor will not function. In other words, as the carrier member approaches zero rotation, the eccentricity of the motor cam will be diminished and such diminution will continue until it is concentric with respect to the shaft at which point the motor will not function.

Viewing the sequential functioning of the parts, it is obvious that as the eccentricity of the motor crank diminishes, the capacity of the motor decreases and it is incapable of receiving as much fluid from the pump as theretofore. Consequently, a gradual slowing up of the planetary carrier—which drives the pump—is permissible because the pump output is being reduced. When the motor capacity reaches zero—incident to the adjustment of the eccentric—the pump (which has been gradually slowing down) comes to a complete stand-still because the motor acts, in effect, as a valve which shuts off the flow of oil from the pump. Under these circumstances, shaft 15 will be turning clockwise. The planetary carrier will be standing still and the orbit gear mounted on carrier 19 will be rotated in a counter-clockwise direction.

Thus, it is apparent that the capacity of the motor is correlated by the eccentrics to the capacity of the pump. When the pump reaches zero speed, the motor has zero capacity and the transmission is in what might be termed a "direct mechanical drive." Were it not for this variable feature, the unit would be inoperative except at one pre-determined speed.

The adjustments make for the variation of speed of the driven shaft 53 and under constant speed conditions of the shaft 15, i. e., if the speed of the pump driving member 21 diminishes, more power will be transmitted by the mechanical coupling of the transmission and less will be transmitted by the hydraulic coupling. Accordingly, the speed of shaft 53 will increase until it reaches the maximum determined by the proportions of the gears. At this point, all of the power is transmitted by the mechanical coupling or side of the transmission and zero power is transmitted by the hydraulic coupling or side of such transmission.

The control means are automatically responsive to the oil pressure within the unit and thus are a measure of engine torque. Furthermore, when the torque increases beyond a pre-determined amount, the resultant pressures will cause a shifting of the eccentric in the direction of greater eccentricity. When the oil pressure (engine torque) decreases below a certain amount, the control will shift the eccentric in the direction of lesser eccentricity. Otherwise stated, the eccentric will always be in such a position that if it shifts in the direction of greater eccentricity, the oil pressure will diminish, whereas, if it shifts in the direction of lesser eccentricity, the oil pressure will tend to rise. The position of the eccentric will be determined by the fact that the engine is driving the load. If the load tends to increase in a direction approaching the capacity of the engine, the oil pressure will increase and will cause a shifting of the eccentric to increase the capacity of the motor and this will relieve the load on the engine by introducing a reduction range. This in turn will cause a diminution in the fluid pressure and the engine or prime mover will now tend to speed up.

It will be understood that as the eccentric shifts to vary the internal capacity of the motor, the counterbalance will shift in a diametrically opposite direction, so that the parts will be in substantial balance. Moreover, it will be understood that slippage of the parts, with respect to each other, will be substantially absent, irrespective of the viscosity, pressure, and temperature of the oil. This is due to the fact of the "line-seal" type of valve construction which embraces relatively large and relatively small surfaces. Accordingly, viewed from one aspect, we have, in the present disclosure, what in effect amounts to a substantial knife edge portion, and which will cooperate with an adjacent sealing surface so as to substantially interrupt the oil or fluid films between those surfaces. Consequently, any flow which will occur will be so minute as to be of no consequence, or else such flow will be non-existent, irrespective of the pressures which occur. It will also be appreciated, with respect to the valve assemblies, that they are in substantially balanced condition. In other words, only relatively small forces will be required to seat or unseat the same, and in their operation, no pumping of fluid will occur.

Thus it is obvious that among others the several objects of the invention as specifically afore noted are achieved. Numerous changes in construction and re-arrangement of the parts might be resorted to without departing from the spirit of the invention as defined by the claims.

I claim:

1. A transmission capable of delivering on the part of the output shaft driving torque in excess of that imparted to its input shaft, said transmission including a driving shaft, a driven shaft, a gearing assembly comprising three intermeshing gears, two of the gears of said assembly being coupled to move with said driving and driven shafts, the third gear moving in response to relative movements of said first named gears and providing a reaction point for the same such that power is transmitted from said driving shaft to said driven shaft, a pump unit connected to said third gear to be driven thereby, a motor unit connected to said driven shaft, means providing an unobstructed passage from said pump to said motor whereby fluid will flow without reduction of pressure or volume from said pump to said motor, a variable eccentric forming a part of said motor and whereby the internal capacity of said motor unit may be correspondingly varied so that said motor unit will function as a metering device to control the volume of fluid delivered by said pump and a counterbalance associated with said motor unit to substantially counteract any condition of unbalance, as developed by said eccentric.

2. A transmission capable of delivering on the part of the output shaft driving torque in excess of that imparted to its input shaft, said transmission including a driving shaft, a driven shaft, a gearing assembly comprising three intermeshing gears, two of the gears of said assembly being coupled to move with said driving and driven shafts, the third gear moving in response to relative movements of said first named gears and providing a reaction point for the same such that power is transmitted from said driving shaft to said driven shaft, a pump unit connected to said third gear to be driven thereby, a motor unit connected to said driven shaft, means providing an unobstructed passage from said pump to said motor whereby fluid will flow without reduction of pressure or volume from said pump to said motor, a variable eccentric forming a part of said motor and whereby the internal capacity of said motor unit may be correspondingly varied so that said motor unit will function as a metering device to control the volume of fluid delivered by said pump, a counterbalance associated with said motor unit to substantially counteract any condition of unbalance as developed by said eccentric and means operable in response to the pressures developed by said pump unit for automatically shifting said eccentric and counterbalance.

3. A transmission capable of delivering on the part of the output shaft driving torque in excess of that imparted to its input shaft, said transmission including a driving shaft, a driven shaft, a gearing assembly comprising three intermeshing gears, two of the gears of said assembly being coupled to move with said driving and driven shafts, the third gear moving in response to relative movements of said first named gears and providing a reaction point for the same such that power is transmitted from said driving shaft to said driven shaft, a pump unit connected to said third gear to be driven thereby, a motor unit connected to said driven shaft, means providing an unobstructed passage from said pump to said motor whereby fluid will flow without reduction of pressure or volume from said pump to said motor, a variable eccentric forming a part of said motor and whereby the internal capacity of said motor unit may be correspondingly varied so that said motor unit will function as a metering device to control the volume of fluid delivered by said pump, a counterbalance associated with said motor unit to substantially counteract any condition of unbalance, as developed by said eccentric, pressure responsive means connected to the pump unit and to both said eccentric and counterbalance and operable in response to increasing fluid pressure developed by said pump unit to shift the eccentric and counterbalance and to increase the internal capacity of said motor.

4. A variable speed transmission comprising in combination a driving shaft, a driven shaft, means coupling said shafts, and including a torque applying driving connection comprising a pump unit operatively connected to said driving shaft, a motor unit operatively connected to said driven shaft, means providing high pressure passages for the flow of fluid from said pump to said motor, means providing low pressure passages for the flow of fluid from said motor to said pump, at least said high pressure passages being free from valvular, pressure-affecting constrictions, said pump and motor each including a plurality of cylinders, a shaft, a crank portion connected to said shaft, and pistons reciprocable within said cylinders whereby the reaction of the pistons of the pump and motor units upon the cylinders thereof enable said motor to apply driving torque to said driven shaft, means for varying the eccentricity of the crank portion of said motor, a counterbalance for said crank portion and means connected to both said counterbalance and motor crank portion for simultaneously shifting the same, whereby the capacity of said motor unit may be varied and the forces set up by said crank portion may be counteracted, pairs of valves corresponding in number to and disposed adjacent each cylinder of the pump and motor, one valve of said pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a seat element and a body element, each of said elements presenting surfaces cooperable with the surface of the adjacent element and means assuring a movement of such surfaces towards each other to interrupt the flow of fluid between such surfaces whereby leakage and slippage is substantially prevented irrespective of the viscosity, temperature and pressure of the power transmitting fluid in such transmission.

5. A variable speed transmission comprising in combination a driving shaft, a driven shaft, means coupling said shafts, and including a torque applying driving connection comprising a pump unit operatively connected to said driving shaft, a motor unit operatively connected to said driven shaft, means providing high pressure passages for the flow of fluid from said pump to said motor, means providing low pressure passages for the flow of fluid from said motor to said pump, at least said high pressure passages being free from valvular, pressure-affecting constrictions, said pump and motor each including a plurality of cylinders, a shaft, a crank portion connected to said shaft, and pistons reciprocable within said cylinders whereby the reaction of the pistons of the pump and motor units upon the cylinders thereof enable said motor to apply driving torque to said driven shaft, means for varying the eccentricity of the crank portion of said motor, a counterbalance for said crank portion and means connected to both said counterbalance and motor crank portion for simultaneously shifting the same, whereby the capacity of said motor unit may be varied and the forces set up by said crank portion may be counteracted, pressure responsive means connected to said high pressure passages and to said shifting means for automatically operating the latter in response to increasing and decreasing fluid pressures as developed by said pump unit, pairs of valves corresponding in number to and disposed adjacent each cylinder of the pump and motor, one valve of said pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a seat element and a body element, each of said elements presenting surfaces cooperable with the surface of the adjacent element and means assuring a movement of such surfaces towards each other to interrupt the flow of fluid between such surfaces whereby leakage and slippage is substantially prevented irrespective of the viscosity, temperature and pressure of the power transmitting fluid in such transmission.

6. A variable speed transmission comprising in combination a driving shaft, a driven shaft, a mechanical drive for said shafts and comprising a differential mechanism forming a torque applying driving connection including three interconnected elements, two of said elements being coupled respectively to said shafts, and the third element being displaceable relative to said two elements, a hydraulic drive forming a part of such transmission and including a system in which slippage is substantially absent irrespective of the viscosity, temperature, and pressure of the power-transmitting fluid in such system, said drive comprising a pump unit operatively connected to the third element of said differential mechanism, a motor unit operatively connected to said driven shaft, means whereby at least one of said units may have its capacity varied, means providing a high pressure passage for the flow of fluid from said pump to said motor, means providing a low pressure passage extending from said motor to said pump, at least said high pressure passage being free from valvular, pressure-affecting constrictions, said pump and motor each including a plurality of cylinders and pistons reciprocable within said cylinders whereby the reaction of the pistons upon said cylinders enable said motor to apply driving torque to said driven shaft, and in addition to the driving torque applied to said shaft through the mechanical drive provided by said differential mechanism, pairs of valves corresponding in number to and disposed adjacent each cylinder of the pump and motor, one of the valves of each pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a relatively movable seat element and body element, each such element presenting surfaces engageable with the surface of the adjacent element, one of such surfaces being of substantially reduced area in comparison with the surface with which it cooperates, and means assuring an engagement between such surfaces, such that the fluid film between the same is substantially ruptured.

7. A variable speed transmission comprising in combination a driving shaft, a driven shaft, a mechanical drive for said shafts and comprising a differential mechanism forming a torque applying driving connection including three interconnected elements, two of said elements being coupled respectively to said shafts, and the third element being displaceable relative to said two elements, a hydraulic drive forming a part of such transmission and including a system in which slippage is substantially absent irrespective of the viscosity, temperature and pressure of the power-transmitting fluid in such system, said drive comprising a pump unit operatively connected to the third element of said differential mechanism, a motor unit operatively connected to said driven shaft, means whereby at least one of said units may have its capacity varied, means providing a high pressure passage for the flow of fluid from said pump to said motor, means providing a low pressure passage extending from said motor to said pump, at least said high pressure passages being free from valvular, pressure-affecting constrictions, said pump and motor each including a plurality of cylinders and pistons reciprocable within said cylinders whereby the reaction of the pistons upon said cylinders enable said motor to apply driving torque to said driven shaft, and in addition to the driving torque applied to said shaft through the mechanical drive provided by said differential mechanism, pairs of valves corresponding in number to and disposed adjacent each cylinder of the pump and motor, one of the valves of each pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a relatively movable seat element and body element, each such element presenting surfaces engageable with the surface of the adjacent element, one of such surfaces being of substantially reduced area in comparison with the surface with which it cooperates, means assuring an engagement between such surfaces, such that the fluid film between the same is substantially ruptured, means providing recesses for the guidance and housing of each of said valve bodies, said recesses and bodies each presenting wall portions, and a packing associated with one of said wall portions and slidably engageable with the second of the same to provide a seal guarding against fluid leakage between said wall portions.

8. A variable speed transmission comprising in combination a driving shaft, a driven shaft, means coupling said shafts, and including a torque applying driving connection comprising a pump unit operatively connected to said driving shaft, a motor unit operatively connected to said driven shaft, means whereby at least one of said units may have its capacity varied, means providing high pressure passages for the flow of fluid from said pump to said motor, means providing low pressure passages for the flow of fluid from said motor to said pump, at least said high pressure passages being free from valvular, pressure-affecting constrictions, said pump and motor each including a plurality of cylinders and pistons reciprocable within said cylinders whereby the reaction of the pistons of the pump and motor units upon the cylinders thereof enable said motor to apply driving torque to said driven shaft, pairs of valves corresponding in number to and disposed adjacent each cylinder of the pump and motor, one valve of said pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a seat element and a body element, each of said elements presenting surfaces engageable with the surface of the adjacent element, the area of one of such surfaces being materially reduced in comparison with the area of the adjacent surface, and means assuring an engagement between said surfaces such that the fluid film between the same is substantially ruptured and whereby slippage is substantially prevented irrespective of the viscosity, temperature and pressure of the power transmitting fluid in such transmission.

9. A variable speed transmission comprising in combination a driving shaft, a driven shaft, means coupling said shafts, and including a torque applying driving connection comprising a pump unit operatively connected to said driving shaft, a motor unit operatively connected to said driven shaft, means whereby at least one of said units may have its capacity varied, means providing high pressure passages for the flow of fluid from said pump to said motor, means providing low pressure passages for the flow of fluid from said motor to said pump, at least said high pressure passages being free from valvular, pressure-affecting constrictions, said pump and motor each including a plurality of cylinders and pistons reciprocable within said cylinders whereby the reaction of the pistons of the pump and motor units upon the cylinders thereof enable said motor to apply driving torque to said driven shaft, pairs of valves corresponding in number to and disposed adjacent each cylinder of the pump and motor, one valve of said pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a seat element and a body element, each of said elements presenting surfaces engageable with the surface of the adjacent element, the area of one of such surfaces being materially reduced in comparison with the area of the adjacent surface, means assuring an engagement between said surfaces such that the fluid film between the same is substantially ruptured and whereby slippage is substantially prevented irrespective of the viscosity, temperature and pressure of the power-transmitting fluid in such transmission, and said valve bodies being formed with openings whereby fluid may flow through the same and act on opposed surfaces of said bodies to balance the latter with respect to the fluid pressure, whereby such valve may be moved without causing pumping of fluid or without having to overcome fluid pressure and, moreover, whereby said fluid pressure produces no effective tendency of said valve to move.

10. A variable speed transmission comprising in combination a driving shaft, a driven shaft, means coupling said shafts, and including a torque applying driving connection comprising a pump unit operatively connected to said driving shaft, a motor unit operatively connected to said driven shaft, means whereby at least one of said units may have its capacity varied, means providing high pressure passages for the flow of fluid from said pump to said motor, means providing low pressure passages for the flow of fluid from said motor to said pump, at least said high pressure passages being free from valvular, pressure-affecting constrictions, said pump and motor each including a plurality of cylinders and pistons reciprocable within said cylinders whereby the reaction of the pistons of the pump and motor units upon the cylinders thereof enable said motor to apply driving torque to said driven shaft, pairs of valves corresponding in number to and disposed adjacent each cylinder of the pump and motor, one valve of said pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a seat element and a body element, each of said elements presenting surfaces engageable with the surface of the adjacent element, the area of one of such surfaces being materially reduced in comparison with the area of the adjacent surface, means assuring an engagement between said surfaces such that the fluid film between the same is substantially ruptured, and whereby slippage is substantially prevented irrespective of the viscosity, temperature and pressure of the power-transmitting fluid in such transmission, means providing recesses for the guidance and housing of each of said valve bodies, said recesses and bodies each presenting wall portions, and a packing associated with one of said wall portions and slidably engageable with the second of the same to provide a seal guarding against fluid leakage between said wall portions.

11. A variable speed transmission comprising in combination, a driving shaft, a driven shaft, a mechanical drive for said shafts and including a differential mechanism forming a torque applying driving connection between said shafts and including inter-connected elements, the last one of which is displaceable relative to the others, the others being coupled respectively to said shafts, a hydraulic drive forming a part of such transmission and including a system in which slippage is substantially absent irrespective of the viscosity, temperature and pressure of the power-transmitting fluid in such system, said drive comprising a pump unit operatively connected to the displaceable elements of said differential mechanism, a motor unit operatively connected to said driven shaft, means whereby at least one of said units may have its capacity varied, means providing a high pressure passage for the flow of fluid from said pump to said motor, means providing a low pressure passage extending from said motor to said pump, at least said high pressure passage being free from valvular, pressure-affecting constrictions, said pump and motor each including a plurality of cylinders and pistons reciprocable within said cylinders whereby the reaction of the pistons upon said cylinders enable said motor to apply driving torque to said driven shaft, and in addition to the driving torque applied to said shaft through the mechanical drive provided by said differential mechanism, pairs of valves corresponding in number to and disposed adjacent each cylinder of the pump and motor, one of the valves of each pair controlling the flow of fluid between the cylinder with which it is associated and the high pressure passage, the other valve of such pair controlling fluid flow between such cylinder and the low pressure passage, means causing timed movements of the valves of each cylinder with respect to the movements of the piston within such cylinder, each of said valves including a relatively movable seat element and body element, each such element presenting surfaces engageable with the surfaces of the adjacent element, one of such surfaces being of substantially reduced area in comparison with the surface with which it cooperates, means assuring an engagement between such surfaces, such that the fluid film between the same is substantially ruptured, and whereby slippage is substantially prevented irrespective of the viscosity, temperature and pressure of the power-transmitting fluid in such transmission, and said valve bodies being formed with openings whereby fluid may flow through the same and act on opposed surfaces of said bodies to balance the latter with respect to the fluid pressure, whereby such valve may be moved without causing pumping of fluid or without having to overcome fluid pressure, and, moreover, whereby said fluid pressure produces no effective tendency of said valve to move.

ELIAS ORSHANSKY, JR.